United States Patent
Lai et al.

(10) Patent No.: US 10,820,025 B2
(45) Date of Patent: Oct. 27, 2020

(54) METHOD AND SYSTEM OF PUSH-TEMPLATE AND URL LIST FOR DASH ON FULL-DUPLEX PROTOCOLS

(71) Applicant: MEDIATEK INC., Hsin-Chu (TW)

(72) Inventors: Wang-Lin Lai, San Jose, CA (US); Shan Liu, San Jose, CA (US); Lulin Chen, San Jose, CA (US)

(73) Assignee: MediaTek, Inc., Hsin-Chu (TW)

( * ) Notice: Subject to any disclaimer, the term of this patent is extended or adjusted under 35 U.S.C. 154(b) by 78 days.

(21) Appl. No.: 16/072,913

(22) PCT Filed: Feb. 3, 2017

(86) PCT No.: PCT/CN2017/072817
§ 371 (c)(1),
(2) Date: Jul. 26, 2018

(87) PCT Pub. No.: WO2017/133659
PCT Pub. Date: Aug. 10, 2017

(65) Prior Publication Data
US 2019/0045238 A1    Feb. 7, 2019

Related U.S. Application Data

(60) Provisional application No. 62/290,494, filed on Feb. 3, 2016, provisional application No. 62/296,628, filed
(Continued)

(51) Int. Cl.
*H04N 21/2387* (2011.01)
*H04N 21/845* (2011.01)
(Continued)

(52) U.S. Cl.
CPC ....... *H04N 21/2387* (2013.01); *H04L 47/365* (2013.01); *H04L 65/00* (2013.01);
(Continued)

(58) Field of Classification Search
CPC ..... H04L 67/02; H04L 69/04; H04L 65/4084; H04N 21/2387; H04N 21/64746
See application file for complete search history.

(56) References Cited

U.S. PATENT DOCUMENTS

| | | |
|---|---|---|
| 2015/0271233 A1 | 9/2015 | Bouazizi |
| 2016/0198012 A1* | 7/2016 | Fablet ................... H04L 67/26 |
| | | 709/231 |

FOREIGN PATENT DOCUMENTS

| | | |
|---|---|---|
| WO | 2015/121342 A1 | 8/2015 |
| WO | 2015148513 A1 | 10/2015 |
| WO | 2015148558 A1 | 10/2015 |

OTHER PUBLICATIONS

H. Ruellan: "DASH and HTTP2 draft-ruellan-httpbis-dash-http2-00"; Network Working Group; Internet-Draft; Intended status: Informational; Mar. 23, 2015; pp. 1-5.
(Continued)

*Primary Examiner* — El Hadji M Sall
(74) *Attorney, Agent, or Firm* — Wolf, Greenfield & Sacks, P.C.

(57) ABSTRACT

A method and system of message exchange for controlling flow associated with multimedia streaming services from a server to a client using DASH are disclosed. In one method, one or more Push Directives are sent from a client to a server to indicate information related to media data requested. At least one selected Push Directive uses one URLTemplate that comprises a list of media parameter values, and where each media parameter value corresponds to one media parameter associated with one media segment requested. The server then pushes one or more groups of data for the media data requested to the client according to the list of media parameter values. In another method, at least one selected Push Directive uses one URLTemplate that includes a first number to represent a number of repeating difference
(Continued)

of media parameter values associated with requested media segments.

19 Claims, 4 Drawing Sheets

Related U.S. Application Data on Feb. 18, 2016, provisional application No. 62/340,614, filed on May 24, 2016.

(51) Int. Cl.
| | | |
|---|---|---|
| *H04L 29/08* | (2006.01) | |
| *H04N 21/25* | (2011.01) | |
| *H04L 29/06* | (2006.01) | |
| *H04N 21/6587* | (2011.01) | |
| *H04N 21/647* | (2011.01) | |
| *H04L 12/805* | (2013.01) | |
| *H04N 21/858* | (2011.01) | |

(52) U.S. Cl.
CPC .......... *H04L 65/4084* (2013.01); *H04L 67/02* (2013.01); *H04L 69/04* (2013.01); *H04N 21/25* (2013.01); *H04N 21/64746* (2013.01); *H04N 21/6587* (2013.01); *H04N 21/8456* (2013.01); *H04N 21/8586* (2013.01)

(56) References Cited

OTHER PUBLICATIONS

International Search Report dated Apr. 26, 2017, issued in application No. PCT/CN2017/072817.
Swaminathan, V., et al.; "WD 2.0 of DASH for Full Duplex Protocols;" International Organization for Standardization; Jun. 2015; pp. 1-27.
Denoual, F., et al.;"Editor Comments on FDH working draft" International Organization for Standardization; Oct. 2015; pp. 1-15.
Denoual, F., et al.; "Comments no Dash-FDH;" International Organization for Standardization; Oct. 2015; pp. 1-9.
Streeter, K., et al.; "URL templates for FDH push directives;" International Organization for Standardization; Oct. 2015; pp. 1-3.
Denoual, F., et al.; "Generic push for DASH over HTTP/2;" International Organization for Standardization; Feb. 2015; pp. 1-6.
Thomas, E., et al.; "Client requested push for DASH;" International Organization for Standardization; Oct. 2014; pp. 1-6.
"Draft Text of ISO/IEC 23009-1 3rd edition;" International Standard; Dec. 2015; pp. 1-190.

\* cited by examiner

METHOD AND SYSTEM OF PUSH-TEMPLATE AND URL LIST FOR DASH ON FULL-DUPLEX PROTOCOLS

CROSS REFERENCE TO RELATED APPLICATIONS

This Application is a national stage filing under 35 U.S.C. 371 of International Patent Application Serial No. PCT/CN2017/072817, filed on Feb. 3, 2017, which claims priority to U.S. Provisional Patent Application, Ser. No. 62/290,494, filed on Feb. 3, 2016, U.S. Provisional Patent Application, Ser. No. 62/296,628, filed on Feb. 18, 2016 and U.S. Provisional Patent Application, Ser. No. 62/340,614, filed on May 24, 2016. The U.S. Provisional Patent Applications are hereby incorporated by reference in their entireties.

TECHNICAL FIELD

The present invention relates to media streaming over Internet. In particular, the present invention relates to methods and systems to improve efficiency of message exchange related to media streaming using DASH (Dynamic Adaptive Streaming over HTTP) on Full-duplex Protocols (FDP).

BACKGROUND

HyperText Transfer Protocol (HTTP) is a set of standards that allow users of the World Wide Web to exchange information found on web pages. It has been de facto standard for Internet access today. Browsers from various developers all support the HTTP as the communication protocol to connect a client to Web servers on the Internet. Through HTTP, a connection between a user and a server can be established so that HTML (HyperTextMarkup Language) pages can be sent to the user's browser. The protocol can also be used to download files from the server either to the browser or to any other requesting application that uses the HTTP.

In recent years, video streaming over Internet has been an important application. Today, video streaming contributes to the most Internet traffic. Various multimedia streaming protocols have been widely used and some of the protocols are based on the HTTP. Dynamic Adaptive Streaming over HTTP (DASH), also known as MPEG-DASH, is an adaptive bitrate streaming technique that enables media content delivery over the Internet based on the conventional HTTP web servers.

The overall flow of media service based on full duplex HTTP-compatible protocols is as follows. The client and server first initiate a media channel, where the server can actively push data to the client, as enabled by HTTP/2 server Push or WebSocket messaging. The channel is established via the HTTP/1.1 protocol upgrade mechanism. After the upgrade, the DASH client requests the media or the MPD (Media Presentation Description) from the server, with a URL (Universal Resource Locator) and a "push strategy". This strategy informs the server about how the client would like media delivery to occur (initiated by the server or initiated by the client). Once the server receives the request, it responds with the requested data and initializes the push cycle as defined in the push strategy.

FIG. 1 illustrates an example of overall flow of video streaming using server push, where block 110 corresponds to the actions taken place at the client side and block 120 corresponds to the actions taken place at the server side. In step 111, the client sends MPD request to the server. The server receives the MPD request in step 121 and responds by sending the MPD in step 122. The client receives the new MPD in step 112 and requests segments in step 113. The server receives the segment request in step 123 and sends segments to the client in step 124. The client receives the segments in step 114 and plays the video data in step 115. If the client desires more media data to be played back, the client may go back to step 111 to request MPD and the server will also go back to step 121 to receive MPD. The push strategy is signalled using "push directive". A push directive has a type and, depending on the type, may have one or more additional parameters associated with it. For example, a push type with additional parameters is shown as following:

PUSH_DIRECTIVE=PUSH_TYPE ";" PUSH_PARAMS.

A type of push directive, "push-template", that uses URLTemplate as its parameter to describe a specific set of URLs is considered for push. A client may use a template to explicitly signal the segments to be pushed during a push transaction. When fully evaluated, the complete list of URLs describes the sequence of segments to be pushed within this push transaction. There are three types of Clause Variable defined in push-template's URLTemplate: {ID}, {Number}, and {Time}.

The Clause Variable {ID} specifies a range of URLs that differ by representation ID and can be expanded using a provided range variable.

The Clause Variable {Number} specifies a range of URLs that differ by segment number. The server generates a URL for each segment number in the range (inclusive)provided by a range variable. With the URL determined for each segment, the server will be able to push the requested segment data to the client.

The Clause Variable {Time} specifies a range or URLs that differ by segment time. URLs will be generated for each subsequent segment until the segment time (i.e., presentation time of the first frame) exceeds the indicated time provided by a time variable.

The current Working Draft of DASH Part 6 FDH, W15685(by V. Swaminathan, K. Streeter, I. Bouazizi, and F. Denoual, "Working Draft for 23009-6: DASH over Full Duplex HTTP-based Protocols (FDH)", MPEG#113, Geneva, Document: W15685, Oct. 2015) has the following open issues regarding push-template using URLTemplate.

A. Handling list of Number values

Current URLTemplate syntax does not efficiently represent segments with non-consecutive address numbers. For example, if a client requests segment numbers 25, 50, 75 and 100, the URLTemplate would be as follows:

"../rep1/segment{Number}": {25-25}: {50-50}: {75-75}: {100-100}

In other words, the segments have to be specified as ranges even if they represent four individual non-consecutive address numbers. In another example presented in the MPEG input document M37432 (L. Liu, X. Zhang, and Z.Guo,"Comments on DASH-FDH URL Templates", MPEG#113, Geneva, Document: M37432, October 2015), URLTemplate is shown as follows:

http://cdn1.example.com/SomeMovie/180180.mp4v
http://cdn1.example.com/SomeMovie/360360.mp4v
http://cdn1.example.com/SomeMovie/540540.mp4v
http://cdn1.example.com/SomeMovie/720720.mp4v In the above example, the URLs of four movie segments have to be specified as individual ranges as shown below, even though they represent four individual non-consecutive address numbers.

"http://cdn1.example.com/SomeMovie/
   {Number}.mp4v":
   {180180-180180}:{360360-360360}:{540540-
     540540}:{720720-720720}

B. Handling Segment URLs Based on SegmentTimeline

In the current URLTemplate, the {Time} parameter specifies that URLs will be generated for each subsequent segment until the segment time exceeds the indicated time. However there may be limitations, as noted in the FDH Working Draft, W15685:

"Note (from MPEG#113): There may be cases where the push-template cannot be handled by URL Template, especially when parameters are expressed with TIME and the MPD describes the segment URLs as template URLs based on a SegmentTimeline with a duration that is not constant across segments."

From DASH Part 1 Specification, W15686 ("Draft Text of ISO/IEC 23009-1 3rd Edition", Geneva, Document: W15686, October 2015), when MDP describes segment URLs based on SegmentTimeline, the Segment URL for a Media Segment is obtained by replacing the $Time$ identifier with the earliest presentation time obtained from the SegmentTimeline. A client can construct the URL list by parsing MPD and perform replacement, such as:

http://mvsite.com/MovieC/rep1/15000.mp4v
   http://mvsite.com/MovieC/rep1/25000.mp4v
   http://mvsite.com/MovieC/rep1/30000.mp4v
   http://mvsite.com/MovieC/rep1/35000.mp4v The values in the URL address 15000, 25000, 30000 and 35000 are the earliest presentation times obtained from the SegmentTimeline, as specified in the DASH Part.1, W15686. Such URLs cannot be efficiently represented using the current URLTemplate.

C. Handling Representation Switching

In certain cases, in order to get to the target representation from the current representation, segments from intermediate representations have to be delivered to the client as specified in M36570 (C. Liu, S. Liu, and S. Lei, "Push Representation switch strategy over full duplex protocols", MPEG#112, Warsaw, Document: M36570, Jun. 2015). For example, the segment request is"../rep1/segment3.mp4", and the push directive may request one segment from each of rep2 and rep4 and then requests the target rep7. Note that the representations involved do not necessarily have consecutive representation ID numbers in the above. In the current FDH Working Draft W15685, such push directives can be specified in the following two ways:

"../rep{ID}/segment{Number}": {2, 4-4}: {4, 5-5}: {7, 6-6}, or

"../rep2/segment4.mp4": {}, "../rep4/segment5.mp4": {}, " ../rep7/segment6.mp4": {}

Neither URLTemplate representation is efficient. Furthermore, the current URLTemplate representation can neither efficiently support representation switching with non-consecutive segments numbers in a given representation nor efficiently support representation switching with URL addresses based on SegmentTimeline.

D. Handling List of Number, Time Values in the URL Address

List of individual values, Number and/or Timestamps is not allowed in the current Working Draft of DASH Part 6 FDH, W15685. Even if the list of individual values, Number and/or Timestamps, were enabled by new syntax structure, it may still be desirable to further improve the syntax representation. For example, the client may request a long list of segments with repeated equal distances, such as Segment numbers 25, 50, 75, 100, 125, 150, 175, 200, 225, etc. In another example, a client may request segments with time-based URL addressing 10000, 15000, 20000, 25000, 30000, 35000, 40000, 45000, etc. It is desirable to develop new messaging techniques to improve the messaging efficiency. Therefore, a syntax structure that enables more compact representation for these cases is highly desirable.

SUMMARY

A method and system of message exchange for controlling flow associated with multimedia streaming services from a server to a client using DASH (Dynamic Adaptive Streaming over HTTP (Hypertext Transfer Protocol)) are disclosed. According to this method, one or more Push Directives are sent from a client to a server to indicate information related to media data requested. At least one selected Push Directive uses one URLTemplate that comprises a list of media parameter values, and where each media parameter value corresponds to one media parameter associated with one media segment requested. The server then pushes one or more groups of data for the media data requested to the client according to the list of media parameter values. The client then plays back said one or more groups of data for the media data received.

The list of media parameter values may represent one or more media parameters selected from a group including {Number}, {Time}, {ID} and {Timestamp}. In one embodiment, each media parameter value corresponds to parameter {Number} to indicate a segment number associated with said one media segment. At the server side, the server will generate a URL for each segment number corresponding to one value in the list of media parameter values. Alternatively, the server may generate a URL for each segment by replacing each {Number} with each value in the list of media parameter values.

In another embodiment, each media parameter value corresponds to parameter {Timestamp} to indicate to the server for generating a URL for each segment by replacing {Timestamp} with each value in the list of media parameter values. In yet another embodiment, each media parameter value corresponds to parameter {Times} and a symbol is used to indicate one or more values specified for parameter {Time} are for a time range or for a list of timestamps, where the symbol may correspond to character "–". For each media parameter value corresponding to parameter {Time}, the server generates a URL for each segment by replacing {Time} with said each media parameter value.

In one embodiment, the list of media parameter values belongs to different media parameters and the different media parameters are separated by a delimiter, such as vertical bar character, "|". In this case, for each specified representation ID, URLs are generated for all media parameter values for one or more indicated media parameters if said one or more indicated media parameters exist, wherein said one or more indicated media parameters belong to a group including parameters {Number}, {Timestamp} and {Time}. The list of media parameter values may include first values for a value range, a list of values or both for parameter {ID}, and second values for another media parameter. In this case, for each specified representation ID, a corresponding value or range is specified for parameter {Number}, {Timestamp} or {Time} if the parameter {Number}, {Timestamp} or {Time} exists. The list of media parameter values may include list values for parameter {ID} to indicate representation switching among representations associated with two or more list values for the parameter {ID}.

In yet another embodiment, URLTemplate further comprises a first push parameter to indicate whether the list of media parameter values is compressed. If the first push parameter indicates that the list of media parameter values is compressed, the URLTemplate further comprises a second push parameter to indicate a string compression process selected for compressing the list of media parameter values. In another embodiment, URLTemplate further comprises a push parameter to indicate a string compression process selected for compressing the list of media parameter values or no compression process used for the list of media parameter values.

Another method and system of message exchange for controlling flow associated with multimedia streaming services from a server to a client using DASH are disclosed. According to this method, a client sends one or more Push Directives from a client to a server to indicate information related to media data requested, where at least one selected Push Directive uses one URLTemplate that includes a first number to represent a number of repeating difference of media parameter values associated with requested media segments. The server pushes one or more groups of data for the media data requested to the client according to the media parameter values associated with the requested media segments. The client then plays back said one or more groups of data for the media data received. The URLTemplate may further comprise a second number to indicate a starting media parameter value and a third number to indicate the repeating difference of media parameter values.

DETAILED DESCRIPTION

Figures 1, 2:
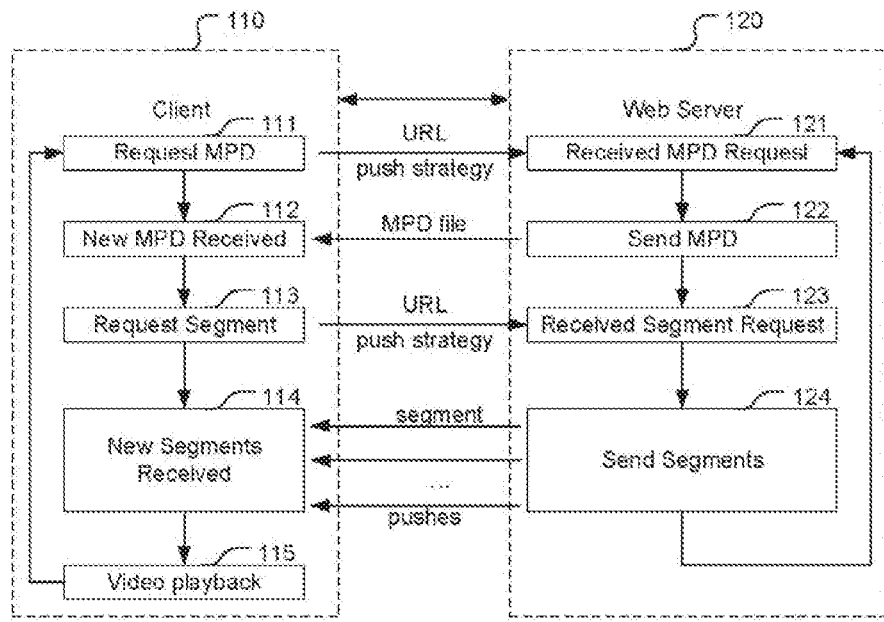
FIG. 1 illustrates an example of the overall flow of video streaming using server push, where a set of communication procedures are used between the server and the client to facilitate media streaming..
FIG. 2 illustrates an example of the URLTemplate that includes changes made to the conventional URLTemplate according to an embodiment of the present invention.

The following description is of the best-contemplated mode of carrying out the invention. This description is made for the purpose of illustrating the general principles of the invention and should not be taken in a limiting sense. The scope of the invention is best determined by reference to the appended claims.

As mentioned previously, the existing streaming protocols have some drawbacks that affect the efficiency of messaging for streaming. Accordingly, techniques to overcome these drawbacks are disclosed in the present invention.

In one aspect of the present invention, modifications to the Working Draft aiming at enabling the following are disclosed:

A. Compact representation for an explicit list of values for URL address such as {Number}, {Time} or {Timestamp}.

B. Compact representation for an explicit list of URLs based on SegmentTimeline.

C. Representation switchingincluding the capability of items A and B.

The modifications may be achieved in lieu of modifying certain parameters or introducing new parameters for URLTemplate. The details of various embodiments according to the present invention are discussed as follows. These parameters are also referred as media parameters in this disclosure.

URLTemplate with List of Values (Number or Time/Timestamps)

According to this method, compact representation for a list of values for parameter{Number} is allowed. For example, the push directives specified previously can be modified as:

a. "../rep1/segment{Number}": {25, 50, 75, 100}, and b. "http://cdn1.example.com/SomeMovie/{Number}.mp4v": {180180, 360360, 540540, 720720}.

As shown in example a, the modified push directive allows multiple non-consecutive segments (i.e., 25, 50, 75 and 100) signalled for a representation (i.e., rep1). In example b, the modified push directive can use a single URLTemplate. Therefore, the URLTemplate according to this method allows efficient signalling of push directives. Note that, additional consideration is needed for push-template containing both parameters {ID} and {Number}. Currently, if both are present, symbol "," is used to separate values for the two parameters types, such as {ID, Number}: {2, 5-7}. More on this will be discussed in a later section.

URLTemplate with Segment URLs Based on SegmentTimeline

To support segment URLs based on SegmentTimeline, where the URL address are the earliest presentation times obtained from the SegmentTimeline, a method to extend or use similar syntax structure of list of values as discussed above is disclosed for handling a list of timestamps. It can be the same parameter type as {Number} or introducing another parameter {Timestamp}, such as:

"http://mvsite.com/MovieC/rep1/{Number}.mp4v": {15000, 25000, 30000}, or

"http://mvsite.com/MovieC/rep1/{Timestamp}.mp4v": {15000, 25000, 30000}

The above modification providesan explicit list of URLs with time-based addressing obtained from SegmentTimeline. Accordingly, the server does not need to parse the MPD.Again additional consideration is needed when the timestamp URL list is used together with parameter {ID} in push-template. More on this will be discussed later.

In one of the examples above, parameter {Number} is used to represent presentation time in the URL list. In other words, for the list of values, the expansion to obtain the URL addresses is the same regardless of whether the underlying values are for Number or for timestamps. Therefore, the parameters of Number and timestamp can be exchangeable with each other in the list. There is no need to distinguish whether the value is for segment number or for time.

In another example, URLTemplate can be constructed by specifying a list of timestamps under parameter {Time} instead of under parameter {Number} or under new parameter {Timestamp}.

List of Values with Repeated Value Difference

Two methods for compact representation of values with repeated difference are disclosed.

The first method introduces a delimiter to indicate the subsequence value that specifies a "difference in value" rather than "value" itself "../rep1/segment{Number}": {25; 5; 10}//Starting value, difference, repeat In this example, the symbol ";" is used as a delimiter, value 25 is the first URL address value, value 5 after ";" is the value difference to be added to produce the next values, value 10 indicates the number of times to be repeated, i.e., {25, 30, 35, 40, 45, 50, 55, 60, 65, 70, 75}.

In another example, the URLTemplate can be constructed by signalling the end value, instead of specifying the number of repeat times, to indicate {25, 30, 35, 40, 45, 50, 55, 60, 65, 70, 75}.

"../rep1/segment{Number}": {25; 5; 75}//Starting value, difference, end value

The second method introduces a format to encompass the values with repeated difference without introducing an additional delimiter.

"../rep1/segment{Number}": {(25, 5, 10)}//Start value, difference, repeat

In this example, the triplet values with the pair of parenthesis, "(" and ")" specify the starting value, difference and the number to repeat. The expansion process knows the format once it encounters the symbol "(" so that there is no need to use a different delimiter to separate values and difference.

In another example, the URLTemplate can be constructed by signalling the end value instead of specifying the number of repeat times.

"../rep1/segment{Number}": {(25, 5, 75)}//Start value, difference, end value

Other symbols may be used as the delimiter for the first method as long as the symbols do not cause ambiguity. Also, other symbol pair, except for the parenthesis pair "(" and ")", can be used to encompass the value and difference as long as the symbols do not lead to ambiguity. For example, the bracket pair "[" and "]" can be used as a delimiter pair.

Handling Representation Switching

To facilitate push-template with both parameter {ID} and the segment list, a method to use a delimiter to clearly separate values specified for different parameters is disclosed according to the present invention. For example, if "|" is selected as the delimiter, the following can be used to specify representation change (i.e., representation switching), where multiple non-consecutive segments from each representation can be requested:

a. "../rep{ID}/segment{Number}": {2|4}: {4|5}: {7|6}
This may represent the following:
../rep2/segment4, ../rep4/segment5, ../rep7/segment6 b. "../rep{ID}/segment{Number}": {2|8, 16, 24}: {4|32, 40}: {7|48}
This may represent the following:
../rep2/segment8, ../rep2/segment16, ../rep2/segment24,
../rep4/segment32, ../rep4/segment40,
../rep7/segment48, Representation switch with URLs based on Segment-Timeline can also be explicitly specified using push-template:

"../rep{ID}/{Number}":
{2|15000, 25000, 30000}: {4|35000, 40000, 50000}: {7|60000, 65000} or

"../rep{ID}/{Timestamp}":
{2|15000, 25000, 30000}: {4|35000, 40000, 50000}: {7|60000, 65000}

Both examples may represent the following:
../rep2/15000, ../rep2/25000, ../rep2/30000,
../rep4/35000, ../rep4/40000, ../rep4/50000,
../rep7/60000, ../rep7/65000

The values in the URL address are the earliest presentation times, which the client obtained from the Segment-Timeline.

For list of values with a repeated difference:
"../rep{ID}/segment{Number}": {2|18; 8; 5}: {4|48; 8; 5} or

"../rep{ID}/segment{Number}": {2|(8, 8, 5)}: {4|(48, 8, 5)}

Both examples may represent the following:
../rep2/segment8, ../rep2/segment16, ../rep2/segment24, ../rep2/segment32, ../rep2/segment32, ... ../rep2/segment40,
../rep4/segment48, ../rep4/segment56, ../rep4/segment64, ../rep4/segment72, ../rep4/segment80, In the above examples, segment numbers 8, 16, 24, 32 and 40 are from rep2, and segments 48, 56, 64, 72 and 80 are from rep4.

In another example for specifying time value, the client obtains the time values from the SegmentTimeline.

"../rep{ID}/{Number/Timestamp}": {2|10000; 5000; 5}: {4|35000; 5000; 5} or

"../rep{ID}/{Number/Timestamp}": {2|(10000, 5000, 5)}: {4|(35000, 5000, 5)}

Both example may represent the following:
../rep2/10000, ../rep2/15000, ../rep2/20000, ../rep2/25000, ../rep2/30000,
../rep4/35000, ../rep4/40000, ../rep4/45000, ../rep4/50000, ../rep4/55000, In the above examples, segment addresses 10000, 15000, 20000, 25000 and 30000 are from rep2, and segment addresses 35000, 40000, 45000, 50000 and 55000 are from rep4.

Embodiment Category A

To achieve the disclosed capabilities mentioned above, this category of embodiments introduces "a list of values" variable, a {Timestamp} parameter variable and a delimiter into the FDH Working Draft. For example, the URLTemplate can be modified as shown in FIG. 2, where the changes from the conventional URLTemplate are highlighted as texts in bold. For example, in FIG. 2, a new Clause variable {Timestamp} (i.e., CLAUSE_VAR_TIMESTAMP) is introduced as indicated by reference number 210. The format of {Timestamp} is indicated by reference number 220. The vertical bar character "|" is used as a delimiter as indicated by reference number 230. The format for "VAL_LIST" is indicated by reference number 240.

Each template item is formed as a URL containing macros for parameterization relative to the segment being requested.

The {Number} parameter is used to specify a range of URLs that differ by the segment number. The {Number} parameter is expanded using a provided range variable or a provided VAL_LIST variable. Parameter {Timestamp} is used to specify a range of URLs that differ by segment time. Parameter {Timestamp} is expanded using a provided VAL_LIST variable. Parameter {Time} is used to specify a range or URLs that differ by the segment time. Parameter {Time} is expanded using a provided time variable. Parameter {ID} is used to specific a range of URLs that differ by the representation ID. Parameter {ID} parameter is expanded using a provided range variable.

A template may include no more than one of the following: a parameter {Number}, a parameter {Timestamp}, or a parameter {Time} parameter.

The URL list will be generated from each template item by evaluating the provided parameter at the server. For number ranges, the server will generate a URL for each segment number in the range provided (inclusive). For number value lists, the server will generate a URL for each segment number explicitly provided in the value list. For timestamp value lists, the server will generate a URL for each segment by replacing {Timestamp} with each of the value explicitly provided in the value list. For time ranges, URLs will be generated for each subsequent segment until the segment time (i.e., presentation time of the first frame) exceeds the indicated time.

Parameters are expanded in a well-defined order to prevent any ambiguity in the template expansion. For each representation ID in the specified range, URLs are generated for all values for the indicated parameter {Number}, {Timestamp} or {Time}, if they exist as specified after the delimiter"|". In other words, the {ID} expansion represents the "outer loop" of the expansion process.

In another embodiment, the URLTemplate can be constructed by extending the usage of parameter {Number} to specify Timestamps in the URLs using VAL_LIST. This embodiment does not need to introduce new parameter {Timestamp}.

In yet another embodiment, the values for a parameter can be a mixture of single values, a list of values and a range of values.

In the above example, the delimiter "," for separating values in the VAL_LIST and the delimiter "|" for separating values for different parameters are just examples according to an embodiment of the present invention. Other symbol may also be used to construct unambiguous parameter values.

More examples incorporating embodiments of the present invention are shown as follows.

a. Example of Push Template with Segment Number Address List

This example shows a push template for use with URLs utilizing segment number addressing. The example shows a push sequence of segment number 25, followed by number 50 and number 75. Note that relative addressing in the URL is used.

"../rep1/segment{Number}.mp4": {25, 50, 75}
   This may represent the following:
      ../rep1/segment25.mp4, ../rep1/segment50.mp4, ../rep1/segment75.mp4 b. Example of Push Template with Segment Addressing Based on SegmentTimeline

This example shows a push template for use with URLs described using SegmentTimeline in MPD. The example shows a push sequence of segment URL address15000, followed by URL address 25000, URL address 30000 and URL address 35000. Note that relative addressing in the URL is used.

"../rep1/{Timestamp}.mp4": {15000, 25000, 30000, 35000}
   This may represent the following:
      ../rep1/15000.mp4, ../rep1/25000.mp4, ../rep1/30000.mp4, ../rep1/35000.mp4

In the above example, the values 15000, 25000 and 30000 in the URL address are the earliest presentation times, which the client obtained from the SegmentTimeline.

c. Example of Push Template with Both Representation ID and Number Addressing

This example shows a push template that pushes segments from different representations. The example shows that a push sequence pushes segments 2-4 from representation 1 followed by a push of segments 5-7 from representation 2.

"../rep{ID}/segment{Number}": {1|2-4}: {2|5-7}
   This may represent the following:
      ../rep1/segment2, ../rep1/segment3, ../rep1/segment4
      ../rep2/segment5, ../rep2/segment6, ../rep2/segment7 d. Example of Push Template with Multiple Representations

This example shows a push template for pushing segments from different representations. The example shows a push sequence that would result in the push of segments 2-4 different representations (i.e., representation ID 2, 4 and 7 respectively). Note that relative addressing in the URL is used.

"../rep{ID}/segment{Number}": {2|2}: {4|3}: {7|4}
   This may represent the following:
      ../rep2/segment2, ../rep4/segment3, ../rep7/segment4 e. Example of Push Template with Multiple Representations and Number Address List This example shows a push template for pushing segments from different representations. The example shows a push sequence that would result in the push of segment numbers 8, 16 and 24 from representation 2, segments 32 and 40 from representation 4, and segment 48 from representation 7. Note that relative addressing in the URL is used.

"../rep{ID}/segment{Number}": {2|8, 16, 24}: {4|32, 40}: {7|81}
   This may represent the following:
      ../rep2/segment8, ../rep2/segment16, ../rep2/segment24,
      ../rep4/segment32, ../rep4/segment40,
      ../rep7/segment48, f. Example of Push Template with Multiple Representations and Address Based on SegmentTimeline This example shows a push template for pushing segments from different representations. The example shows a push sequence that would result in the push of URL addresses15000, 25000 and 30000 from representation 2, URL address 35000, 40000 and 50000 from representation 4, and URL address 60000 and 65000 from representation 7. Note that relative addressing in the URL is used.

"../rep{ID}/{Timestamp}": {2|15000, 25000, 30000}: {4|35000, 40000, 50000}: {7|60000, 65000}
   This may represent the following:
      ../rep2/15000, ../rep2/25000, ../rep2/30000,
      ../rep4/35000, ../rep4/40000, ../rep4/50000,
      ../rep7/60000, ../rep7/65000

In the above example, the values in the URL address are the earliest presentation times, which the client obtained from the SegmentTimeline.

Embodiment Category B

Figure 3:
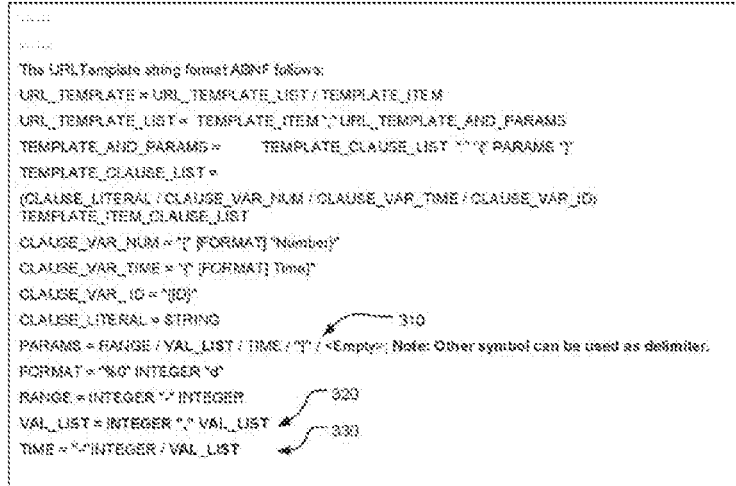
FIG. 3 illustrates an example of the URLTemplate that includes changes made to the conventional URLTemplate according to another embodiment of the present invention.

According to this category of embodiments, URLTemplate is constructed by extending the usage of {time} parameter to cover both time range as current FDH specification and list of timestamps (i.e., VAL_LIST in this invention). This is achieved by using the symbol "−" as identification to distinguish between time-range and the list of time stamps. For example, the URLTemplate can be modified as shown in FIG. 3, where the changes made from the conventional URLTemplate are highlighted as texts in bold.For example, in FIG. 3, the vertical bar character "|" is used as a delimiter as indicated by reference number 310. The format for "VAL_LIST" is indicated by reference number 320. Parameter {Time} can be represented by an ending value (i.e., "−"INTEGER) or a list of times (i.e., VAL_LIST).

Each template item is formed as a URL containing macros for parameterization relative to the segment being requested. Parameter {Number} is used to specify a range of URLs that differ by the segment number. Parameter {Number} is expanded using a provided range variable or a provided VAL_LIST variable. Parameter {Time} is used to specify a range or URLs that differ by the segment time. Parameter {Time} is expanded using a provided time variable. The {ID} parameter is used to specific a range of URLs that differ by representation ID. Parameter {ID} is expanded using a provided range variable.

A template may include parameter {Number}, or parameter {Time}, but not both. The URL list will be generated from each template item by evaluating the provided parameter. For number ranges, the server will generate a URL for each segment number in the range provided (inclusive). For number value lists, the server will generate a URL for each segment number explicitly provided in the value list. For time ranges, specified using symbol,"−"INTEGER, URLs will be generated for each subsequent segment until the segment time (i.e., presentation time of the first frame) exceeds the indicated time.For time value lists specified using VAL_LIST, the server will generate a URL for each segment by replacing {Time} with each of the value explicitly provided in the value list.

Parameters are expanded in a well-defined order to prevent any ambiguity in the template expansion. For each representation ID in the specified range, URLs are generated for all values for the indicated parameter {Number} or {Time} if they exist as specified after the delimiter"|". In other words, the {ID} expansion represents the "outer loop" of the expansion process.

In other embodiment examples, the values for a parameter can be a mixture of single values, a list of values ora range of values. The delimiter "," for separating values in the VAL_LIST and the delimiter"|" for separating values for different parameters are just examples to illustrate an embodiment of the present invention. Other symbols can be usedto construct unambiguous parameter values as well.

More examples incorporating embodiments of the present invention are shown as follows.Some examples presented for embodiment Category A are also applicable to embodiment Category B. Accordingly, only these examples that are different from embodiment Category A are presented as follows.

a. Example of Push Template with Time-Based Addressing

This example shows a push template for use with URLs utilizing time-based addressing. The example shows a push sequence that terminates at presentation time 10000. Note that relative addressing in the URL is used.

"../rep1/segment{Time}.mp4": {−10000} b. Example of Push Template with Segment Addressing Based on SegmentTimeline

This example shows a push template for use with URLs described using SegmentTimeline in the MPD. The example shows a push sequence of segment URL address15000, followed by URL address 25000, URL address 30000 and URL address 35000. Note that relative addressing in the URL is used.

"../rep1/{Time}.mp4": {15000, 25000, 30000, 35000}
      This may represent the following:
      ../rep1/15000.mp4, ../rep1/25000.mp4, ../rep1/30000.mp4, ../rep1/35000.mp4

In the above example, the values 15000, 25000 and 30000 in the URL address are the earliest presentation times, which the client obtained from the SegmentTimeline.

The usage of delimiter (e.g."|") in both embodiment Categories A and B can be further generalized such that the parameter values for {ID} can also be a range, a value or empty. For example, the following alternative representations can be used:

a. Empty ID Values Indicating ID is Fixed

"../rep1/segment{Number}.mp4": {|25, 50, 75}
      This may represent the following:
      ../rep1/segment25.mp4, ../rep1/segment50.mp4, ../rep1/segment75.mp4

"../rep1/segment{Timestamp}.mp4": {|15000, 25000, 30000, 35000}
      This may represent the following:
      ../rep1/segment15000.mp4, ../rep1/segment25000.mp4, ../rep1/segment30000.mp4, ../rep1/segment35000.mp4 b. Range or List of Values for ID

"../rep{ID}/segment{Number}": {1-2|2-4, 5-7}
      This may represent the following:
      ../rep1/segment2, ../rep1/ segment3, ../rep1/segment4
      ../rep2/segment5, ../rep2/segment6, ../rep2/segment7

"../rep{ID}/segment{Number}": {2,4,7|2, 3, 4}
      This may represent the following:
      ../rep2/segment2, ../rep4/segment3, ../rep7/segment4

"../rep{ID}/segment{Number}": {2|8, 16, 24}: {4|32, 40}: {7|48}
      This may represent the following:
      ../rep2/segment8, ../rep2/segment16, ../rep2/segment24,
      ../rep4/segment32, ../rep4/segment40,
      ../rep7/segment48, "../rep{ID}/{Timestamp}": {2|15000, 25000, 30000}: {4|35000, 40000, 50000}: {7|60000, 65000}
      This may represent the following:
      ../rep2/15000, ../rep2/25000, ../rep2/30000,
      ../rep4/35000, ../rep4/40000, ../rep4/50000,
      ../rep7/60000, ../rep7/65000

Figure 4:
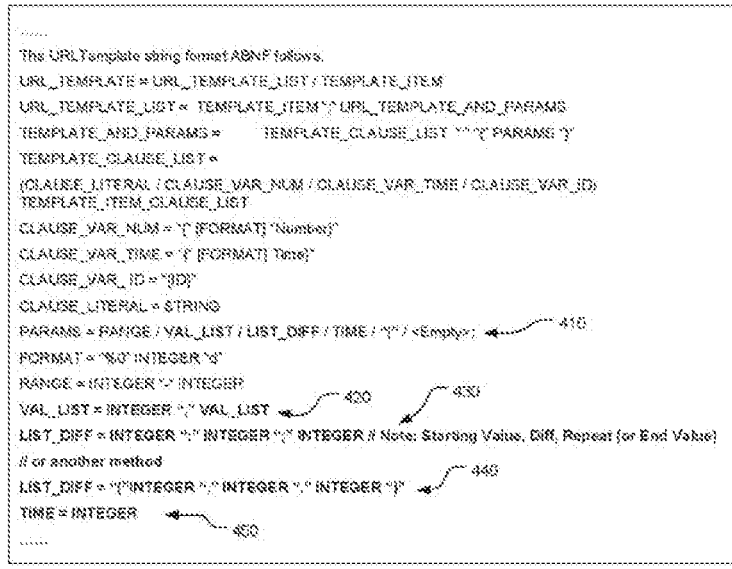
FIG. 4 illustrates an example of the URLTemplate that includes changes made to the conventional URLTemplate according to yet another embodiment of the present invention.

"../rep{ID}/segment{Timestamp}.mp4": {1-3|500-1000, 2000-3000,15000-35000}
      This may represent the following:
      Segments in rep1 with timestamp values between 500 to 1000,
      Segments in rep2 with timestamp values between 2000 to 3000,
      Segments in rep3 with timestamp values between 15000 to 35000, "../rep{ID}/segment{Time}.mp4": {1-3|−1000, −3000, −35000}
      This may represent the following:
      Segments in rep1 with timestamp values less than 1000,
      Segments in rep2 with timestamp values between 1000 to 3000,
      Segments in rep3 with timestamp values between 3000 to 35000, Embodiment Category C According to this category of embodiments, URLTemplate is constructed by introducing a "list of values" variable and "list of values with same difference" variable to the FDH Working Draft. For example, the URLTemplate can be modified as shown in FIG. 4, where the changes from the conventional URLTemplate are highlighted as texts in bold. For example, in FIG. 4, the parameter includes VAL_LIST and LIST_DIFF (i.e., list of values with same difference) separated by a vertical bar character "|" as a delimiter as indicated by reference number 410. The format for "VAL_LIST" is indicated by reference number 420 and the format for "LIST_DIFF" is indicated by reference number 430, where character "," is used as a delimiter to separate list values in LIST_DIFF. Alternatively, character ";" can be used as a delimiter to separate list values in LIST_DIFF as indicated by reference number 440. Parameter {Time} can be represented by a starting value (i.e., INTEGER") as indicated by reference number 450.

The URL list will be generated from each template item by evaluating the provided parameter. For number ranges, this means generating a URL for each segment number in the range provided (inclusive). For value lists (i.e., VAL_LIST), this means generating a URL for each segment by replacing {Parameter(Time,Number,Timestamp)} with each of the value explicitly provided in the value list. For list of values with same difference (i.e., LIST_DIFF), this means first generating a list of values starting from the Starting Value, adding the Difference to produce the next values, until number of Repeat being reached (or until exceeding the End Value). A URL for each segment is then generated by replacing {Parameter(Time,Number,Timestamp)} with each of the value obtained in the first step. For time ranges, URLs will be generated for each subsequent segment until the segment time (i.e., presentation time of the first frame) exceeds the indicated time.

Parameters are expanded in a well-defined order to prevent any ambiguity in the template expansion. For each representation ID in the specified range, URLs are generated for all values for the indicated {Number}, {Timestamp}, or {Time} parameter, if they exist as specified after the delimiter"|". In other words, the {ID} expansion represents the "outer loop" of the expansion process.

URLList Values, Representation Switching

The most generic method to request multiple segments with specific URL addressesis to use URL list as a special example of URLTemplate. For example, URL list can be specified with number values.

"../rep1/segment25.mp4", "../rep1/segment50.mp4", "../rep1/segment75.mp4"

For example, the URL list can be specified with segment time:

"../SomeMovie/rep1/15000.mp4v", "../SomeMovie/rep1/25000.mp4v", "../SomeMovie/rep1/30000.mp4v".

In another example, the URL list can be specified with representation switching:

"../rep1/segment2.mp4", "../rep1/segment3.mp4", "../rep2/segment4.mp4"

For compact representation, the aforementioned examples can also be implemented using URLTemplate with macro expansion, such as:

"../rep1/segment{}.mp4": {25, 50, 75}
"../SomeMovie/rep1/{}.mp4v": {15000, 25000, 30000}
"../rep{}/segment{}.mp4": {1|2, 3}: {2|4}

It is observed that the crux of URLTemplate is to only specify the values of the parameters (i.e., representation, segment number, time, etc.) while the common part of URL is only signalled once. The same spirit can also be found in the string compression methods, which eliminate duplicated strings. Thus, in addition to the usage of URLTemplate, the present invention also discloses a URL list with compression. Table 1 illustrates an example of URL list with compression according to an embodiment of the present invention.

TABLE 1

| PushType | PushParams | Description |
| --- | --- | --- |
| urn:mpeg:dash:fdh:2016:push-urllist | C: Binary value<br>N: (if C is 1) k bits<br>URLlist | C: 1-bit binary value to indicate whether compression is used for the subsequent list of URL addresses.<br>N: If C is 1 (compression is utilized), this k-bit field specifies the compression methods used to compress the subsequent list of URL addresses.<br>URLlist explicitly specifies the URL addresses of some segments are considered for push.<br>A server receiving such push directive may use it to identify some segments to push.<br>A client receiving such push directive can be informed on the segments the server intends to push. |

In the above example, for the push type push-urllist, a 1-bit binary value C is first signalled to indicate whether compression is used for the subsequent URL list. If the value of C is 0, the next parameter will be the URL list, which explicitly specifies each of the URL of the requested segments. If the value of C is 1, the next parameter will be a k-bit value N, which specifies the compression methods used to compress the subsequent URL list. For example, if k is equal to 2, values 00, 01, 10 and 11 can be used to indicate different compression methods. Common string compression methods, such as DEFLATE (IETF RFC 1951), HPACK (IETF RFC 7541 Header compression), LZ, etc. can be selected as shown in Table 2. The next parameter will be the compressed URL list which explicitly specifies each of the URL of the requested segments. Upon receiving this push type and the corresponding parameters, the server can decompress the URL list using the specified compression method (e.g. value N).

TABLE 2

| N (2-bit example) | Compression |
| --- | --- |
| 00 | DEFLATE |
| 01 | HPACK |
| 10 | LZMA |
| 11 | LZ77 |

Table 3 illustrates another example of URL list with a compression method according to an embodiment of the present invention.

TABLE 3

| PushType | PushParams | Description |
| --- | --- | --- |
| urn:mpeg:dash:fdh:2016:push-urllist | N: (if C is 1) k bits URLlist | N: This k-bit field specifies whether compression is used, and the compression method, for the subsequent list of URL addresses.<br>URLlist explicitly specifies the URL addresses of some segments are considered for push.<br>A server receiving such push directive may use it to identify some segments to push.<br>A client receiving such push directive can be informed on the segments the server intends to push. |

In the above example, for the push type push-urllist, a k-bit value N is first signalled. It specifies whether compression is used and the compression method for the subsequent list of URL address. For example, if k is equal to 2, values 00, 01, 10 and 11 can be used to indicate four different compression modes as shown in Table 4.

TABLE 4

| N (2-bit example) | Compression |
| --- | --- |
| 00 | No compression |
| 01 | DEFLATE |
| 10 | HPACK |
| 11 | LZMA |

The next parameter will be the compressed URL list, which explicitly specifies each of the URL of the requested segments. Upon receiving this push type and the corresponding parameters, the server can decompress the URL list using the specified compression method (value N).

Besides fixed length coding for the value N, variable length coding can also be utilized. Various examples are shown in Table 5 to Table 8.

TABLE 5

| N | Compression |
| --- | --- |
| 1 | DEFLATE |
| 01 | HPACK |
| 001 | LZMA |
| 0001 | LZ77 |

TABLE 6

| N | Compression |
| --- | --- |
| 0 | DEFLATE |
| 10 | HPACK |
| 110 | LZMA |
| 1110 | LZ77 |

TABLE 7

| N (2-bit example) | Compression |
| --- | --- |
| 0 | No compression |
| 10 | DEFLATE |
| 110 | HPACK |
| 1110 | LZMA |

TABLE 8

| N (2-bit example) | Compression |
| --- | --- |
| 1 | No compression |
| 01 | DEFLATE |
| 001 | HPACK |
| 0001 | LZMA |

Figure 5:
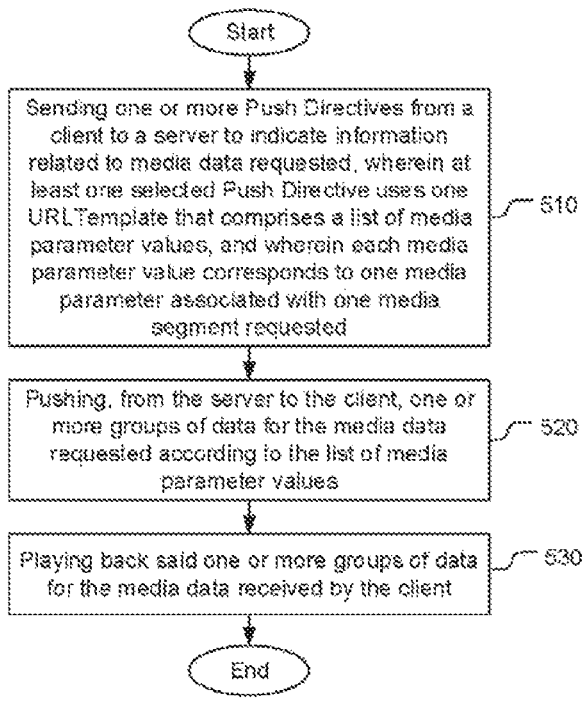
FIG. 5 illustrates an exemplary flowchart for a system incorporating message exchange for controlling flow associated with multimedia streaming services from a server to a client using DASH (Dynamic Adaptive Streaming over HTTP (Hypertext Transfer Protocol)) according to an embodiment of the present invention.

FIG. 5 illustrates an exemplary flowchart for a system incorporating message exchange for controlling flow associated with multimedia streaming services from a server to a client using DASH (Dynamic Adaptive Streaming over HTTP (Hypertext Transfer Protocol)) according to an embodiment of the present invention. The steps shown in the flowchart may be implemented as program codes executable on one or more processors (e.g., one or more CPUs) at the server side and/or the client side. The steps shown in the flowchart may also be implemented based hardware such as one or more electronic devices or processors arranged to perform the steps in the flowchart. According to this method, the client sends one or more Push Directives from a server to indicate information related to media data requested in step 510, where at least one selected Push Directive uses one URLTemplate that comprises a list of media parameter values, and wherein each media parameter value corresponds to one media parameter associated with one media segment requested. As described in this disclosure, the use of a list of media parameter values allows the URLTemplate signalled in a compact form. In step 520, the server pushes one or more groups of data for the media data requested to the client according to the list of media parameter values. As mentioned in the disclosure, the server will evaluate and expand the URLTemplate that are signalled in a compact form to full URL addresses to locate the segments to be sent. The client can then play back said one or more groups of data for the media data received in step 530.

In FIG. 5, the steps of the message exchange for controlling flow associated with multimedia streaming services according to an embodiment of the present invention are disclosed for both the server side and the client side. However, the steps at each of the server side and the client side can be identified accordingly.

Figure 6:
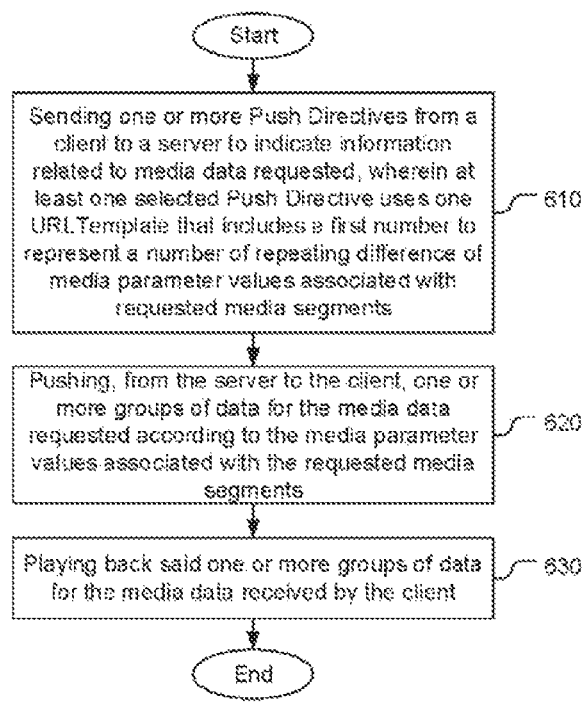
FIG. 6 illustrates an exemplary flowchart for a system incorporating message exchange for controlling flow associated with multimedia streaming services from a server to a client using DASH (Dynamic Adaptive Streaming over HTTP (Hypertext Transfer Protocol)) according to another embodiment of the present invention.

FIG. 6 illustrates an exemplary flowchart for a system incorporating message exchange for controlling flow associated with multimedia streaming services from a server to a client using DASH according to another embodiment of the present invention. The steps shown in the flowchart may be implemented as program codes executable on one or more processors (e.g., one or more CPUs) at the server side and the client side. The steps shown in the flowchart may also be implemented based hardware such as one or more electronic devices or processors arranged to perform the steps in the flowchart. According to this method, the client sends one or more Push Directives from a client to a server to indicate information related to media data requested in step 610, where at least one selected Push Directive uses one URLTemplate that includes a first number to represent a number of repeating difference of media parameter values associated with requested media segments. As described in this disclosure, the use of a list of media parameter values and the number of repeating difference of media parameter values allows the URLTemplate signalled in a compact form. In step 620, the server pushes one or more groups of data for the media data requested according to the media parameter values associated with the requested media segments. As mentioned in the disclosure, the server will evaluate and expand the URLTemplate that are signalled in a compact form to full URL addresses to locate the segments to be sent. The client can then play back said one or more groups of data for the media data received in step 630.

In FIG. 6, the steps of the message exchange for controlling flow associated with multimedia streaming services according to an embodiment of the present invention are disclosed for both the server side and the client side. However, the steps at each of the server side and the client side can be identified accordingly.

The flowchart shown above is intended to illustrate examples of messaging between a server and a client for media streaming incorporating embodiments of the present invention. A person skilled in the art may modify each step, re-arranges the steps, split a step, or combine the steps to practice the present invention without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be a circuit integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of message exchange for controlling flow associated with multimedia streaming services performed by a client using DASH (Dynamic Adaptive Streaming over HTTP (Hypertext Transfer Protocol)), the method comprising:
    sending one or more Push Directives to a server to indicate information related to media data requested, wherein at least one selected Push Directive uses one URLTemplate that comprises a URL associated with a plurality of segments and a list of a plurality of media parameter values wherein:
        each media parameter value of the list of the plurality of the media parameter values is configured to be substituted into the URL to resolve the URL to a segment specified by the media parameter value; and
        each media parameter value comprises a number;
    receiving one or more groups of data pushed from the server for the media data requested according to the list of the plurality of media parameter values, comprising receiving data for a set of segments specified by the URL and the list of the plurality of media parameter values; and
    playing back said one or more groups of data for the media data received.

2. The method of claim 1, wherein the list of the plurality of media parameter values represent one or more media parameters selected from a group including parameters {Number}, {Time }, {ID } and {Timestamp }.

3. The method of claim 2, wherein each media parameter value corresponds to parameter {Number} to indicate a segment number associated with one media segment.

4. The method of claim 2, wherein each media parameter value corresponds to parameter {Times} and a symbol is used to indicate one or more values specified for parameter {Time} are for a time range or for a list of timestamps.

5. The method of claim 4, wherein the symbol corresponds to character.

6. The method of claim 1, wherein the list of the plurality of media parameter values belongs to different media parameters and the different media parameters are separated by a delimiter.

7. The method of claim 6, wherein the delimiter corresponds to vertical bar character, "|".

8. The method of claim 6, wherein for each specified representation ID, URLs are generated for all media parameter values for one or more indicated media parameters if said one or more indicated media parameters exist, wherein said one or more indicated media parameters belong to a group including parameters {Number}, {Timestamp} and {Time}.

9. The method of claim 6, wherein the list of the plurality of media parameter values include first values for a value range, a list of values or both for parameter {ID}, and second values for another media parameter.

10. The method of claim 9, wherein for each specified representation ID, a corresponding value or range is specified for parameter {Number}, {Timestamp} or {Time} if the parameter {Number}, {Timestamp } or {Time } exists.

11. The method of claim 6, wherein the list of the plurality of media parameter values includes list values for parameter {ID } to indicate representation switching among representations associated with two or more list values for the parameter {ID}.

12. The method of claim 1, wherein the list of the plurality of media parameter values comprises segment numbers and segment timelines for the server to expand one or more URL templates to generate one or more URL addresses using the list of the plurality of media parameter values, and wherein underlying values for the segment numbers and the segment timelines are treated in a same manner by replacing each parameter with each value in the list of the plurality of media parameter values.

13. A method of message exchange for controlling flow associated with multimedia streaming services performed by a server using DASH (Dynamic Adaptive Streaming over HTTP (Hypertext Transfer Protocol)), the method comprising:
receiving one or more Push Directives from a client to indicate information related to media data requested, wherein at least one selected Push Directive uses one URLTemplate that comprises a URL associated with a plurality of segments and a list of a plurality of media parameter values wherein:
each media parameter value of the list of the plurality of the media parameter values is configured to be substituted into the URL to resolve the URL to a segment specified by the media parameter value; and
each media parameter value comprises a number; and
pushing one or more groups of data to the client for the media data requested according to the list of the plurality of media parameter values for the client to play back said one or more groups of data for the media data received.

14. The method of claim 13, wherein each media parameter value corresponds to parameter {Number} to indicate a segment number associated with one media segment, wherein:
the server generates a URL for each segment number corresponding to one value in the list of the plurality of media parameter values; or
the server generates a URL for each segment by replacing each parameter {Number} with each value in the list of the plurality of media parameter values.

15. A client device for receiving media services using DASH (Dynamic Adaptive Streaming over HTTP (Hypertext Transfer Protocol)), the client device comprising one or more electronic circuits or processors arranged to:
send one or more Push Directives to a server to indicate information related to media data requested, wherein at least one selected Push Directive uses one URLTemplate that comprises a URL associated with a plurality of segments and comprises a list of a plurality of media parameter values, wherein:
each media parameter value of the list of the plurality of the media parameter values is configured to be substituted into the URL to resolve the URL to a segment specified by the media parameter value; and
each media parameter value comprises a number;
receive one or more groups of data from the server for the media data requested according to the list of the plurality of media parameter values, comprising receiving data for a set of segments specified by the URL and the list of the plurality of media parameter values; and
play back said one or more groups of data for the media data received.

16. A method of message exchange for controlling flow associated with multimedia streaming services performed by a client using DASH (Dynamic Adaptive Streaming over HTTP (Hypertext Transfer Protocol)), the method comprising:
sending one or more Push Directives to a server to indicate information related to media data requested, wherein at least one selected Push Directive uses one URLTemplate that includes a first number to represent a number of repeating difference of media parameter values associated with requested media segments;
receiving one or more groups of data pushed from the server for the media data requested according to the media parameter values associated with the requested media segments; and
playing back said one or more groups of data for the media data received.

17. The method of claim 16, said one URLTemplate further comprises a second number to indicate a starting media parameter value and a third number to indicate the number of repeating difference of media parameter values.

18. A method of message exchange for controlling flow associated with multimedia streaming services performed by a server using DASH (Dynamic Adaptive Streaming over HTTP (Hypertext Transfer Protocol)), the method comprising:
receiving one or more Push Directives from a client to indicate information related to media data requested, wherein at least one selected Push Directive uses one URLTemplate that includes a first number to represent a number of repeating difference of media parameter values associated with requested media segments; and
pushing one or more groups of data to the client for the media data requested according to the media parameter values associated with the requested media segments for the client to play back said one or more groups of data for the media data received by the client.

19. A client device for receiving media services using DASH (Dynamic Adaptive Streaming over HTTP (Hypertext Transfer Protocol)), the client device comprising one or more electronic circuits or processors arranged to:

send one or more Push Directives to a server to indicate information related to media data requested, wherein at least one selected Push Directive uses one URLTemplate that includes a first number to represent a number of repeating difference of media parameter values associated with requested media segments;

receive one or more groups of data from the server for the media data requested according to the media parameter values associated with the requested media segments; and play back said one or more groups of data for the media data received.

\* \* \* \* \*